(12) United States Patent
Fa

(10) Patent No.: US 6,714,947 B2
(45) Date of Patent: Mar. 30, 2004

(54) METHOD AND SYSTEM FOR MAKING PRODUCTION PLAN

(75) Inventor: Shih-Shan Fa, Taipei (TW)

(73) Assignee: Inventec Corporation, Taipei (TW)

( * ) Notice: Subject to any disclaimer, the term of this patent is extended or adjusted under 35 U.S.C. 154(b) by 305 days.

(21) Appl. No.: 09/944,130

(22) Filed: Sep. 4, 2001

(65) Prior Publication Data

US 2003/0046262 A1 Mar. 6, 2003

(51) Int. Cl.⁷ ............................................. G06F 17/30
(52) U.S. Cl. ...................................... 707/104.1; 705/8
(58) Field of Search ........................... 707/104.1; 705/8

(56) References Cited

U.S. PATENT DOCUMENTS

| | | | | |
|---|---|---|---|---|
| 5,406,475 A | * | 4/1995 | Kouchi et al. .................. | 705/8 |
| 5,712,985 A | * | 1/1998 | Lee et al. ....................... | 705/7 |
| 5,854,746 A | * | 12/1998 | Yamamoto et al. .......... | 700/106 |
| 6,122,560 A | * | 9/2000 | Tsukishima et al. ........ | 700/106 |
| 6,249,768 B1 | * | 6/2001 | Tulskie et al. .................. | 705/7 |
| 2002/0019761 A1 | * | 2/2002 | Lidow .......................... | 705/10 |
| 2002/0055883 A1 | * | 5/2002 | Shiba et al. ................... | 705/26 |
| 2002/0072986 A1 | * | 6/2002 | Aram ........................... | 705/26 |
| 2002/0095307 A1 | * | 7/2002 | Greamo et al. ................ | 705/1 |
| 2002/0133435 A1 | * | 9/2002 | Ito et al. ........................ | 705/28 |
| 2002/0161614 A1 | * | 10/2002 | Spira et al. ..................... | 705/7 |
| 2002/0188499 A1 | * | 12/2002 | Jenkins et al. ................ | 705/10 |
| 2003/0033180 A1 | * | 2/2003 | Shekar et al. .................. | 705/7 |

* cited by examiner

Primary Examiner—Wayne Amsbury
(74) Attorney, Agent, or Firm—Rothwell, Figg, Ernst & Manbeck, P.C.

(57) ABSTRACT

A method and a system for making a production plan are proposed, for allowing a request from a client to be analyzed in real time, and the production plan to be constructed in response to manufactured or semi-manufactured products at a production line, so as to implement production according to the production plan and allow a production condition to be effectively controlled and managed. Moreover, the method and system for making a production plan allow a production cycle and human resources to be effectively controlled and adjusted respectively, so that sale, purchase and manufacture departments can realize the latest production and export conditions according to the production plan. In addition, in the use of the method and system for making a production plan, the manufactured products can be effectively controlled in stock and exportation.

6 Claims, 4 Drawing Sheets

FIG. 4(A)

| Data | Section | model | Qty | Manufacture completing section | PIA | Packaging | Pallet |
|---|---|---|---|---|---|---|---|
| July 15 | Manufacture completing section | A1 | 100 | 100 | 0 | 0 | 0 |
| | | A2 | 300 | 300 | 0 | 0 | 0 |
| | | A3 | 200 | 200 | 0 | 0 | 0 |

FIG. 4(B)

| model | Identification number |
|---|---|
| A1 | ID0001 |
| | ID1001 |
| | ID1101 |
| | ID1201 |
| A2 | ID1002 |
| | ID1202 |
| | ID1302 |
| | ID1502 |
| | ID1602 |

METHOD AND SYSTEM FOR MAKING PRODUCTION PLAN

FIELD OF THE INVENTION

The present invention relates to methods and systems for making production plans, and more particularly, to a method and a system for making a production plan, in which a production plan can be constructed in instant response to a request from a client, so as to shorten the production cycle and improve the production efficiency.

BACKGROUND OF THE INVENTION

A manufacturer such as a computer manufacturer generally employs two types of production processes, including a first production process and a second production process. In the first production process, according to products predicted to be required for a client recently and situations of production rate and material availability, a production plan is pre-made and performed for manufacturing the products, and then the products are packaged and finally processed to be readily delivered to the client in response to an actual request from the client. In the second production process, the products are manufactured directly based on the client's request, and are all packaged in an identical manner to be delivered to the client.

In the use of the first production process for product manufacture, as the production plan is constructed according to practical requirements, it therefore improves the flexibility in production and easiness for product management. For manufacturing products e.g. a computer peripheral device such as hard disk, CD-ROM or motherboard, or CPU, that is, the products are manufactured in a manner of more categories and less quantity, the products are packaged and exported according to the categories thereof, and thus production difficulty is reduced. However, this generates drawbacks such as a prolonged production cycle and excess in manufactured products, semi-manufactured products or raw materials, as well as worse flexibility in response to price reduction for parts (e.g. CPU price reduction) and occurrence of repetition in manufacture. Furthermore, in the case of employing the second production process, since products are manufactured as requested by the client in a manner of less categories and more quantity, conditions of product exportation and product manufacture are easily controlled and monitored, and also the production cycle and responding time to the occurrence of repetition in manufacture are both reduced. However, as the situation of production rate is not pre-estimated, complexity in the production process is increased, which makes the product management more difficult and flexibility for adjusting human resources deteriorated.

In addition, in the foregoing two production processes, after the products are completely manufactured, as an optimal product logistic system is not available for stocking and exporting the manufactured products, product controlling and management can not be easily achieved.

Therefore, it is desired to solve the above problems, for effectively monitoring the production process and controlling product exportation, so as to allow sale, purchase and manufacture departments to realize information relating to the production process and accordingly improve the production efficiency.

SUMMARY OF THE INVENTION

A primary objective of the present invention is to provide a method and a system for making a production plan, for allowing a request from a client to be analyzed in real time, and the production plan to be constructed in response to manufactured or semi-manufactured products at a production line, so as to implement production according to the production plan and allow a production condition to be effectively controlled and managed. Moreover, the method and system for making a production plan allow a production cycle and human resources to be effectively controlled and adjusted respectively, so that sale, purchase and manufacture departments can realize the latest production and export conditions according to the production plan. In addition, in the use of the method and system for making a production plan, the manufactured products can be effectively controlled in stock and exportation.

In accordance with the foregoing and other objectives, the present invention proposes a method and a system for making a production plan. The method for making a production plan is used for connecting a manufacturer to the system for making a production plan through a network, wherein the system constructs a production plan according to a product request from a client for allowing the manufacturer to acquire latest conditions in product manufacture and exportation, and includes a stock database for storing raw material data, a request database for storing data relating to the product request from the client, a production plan database for storing data relating to the production plan, and an export database for storing data relating to the product exportation.

The method for making a production plan comprising the steps of: (1) analyzing via the system for making a production plan product items possibly requested from the client, so as to allow a purchase unit of the manufacturer to purchase in advance raw materials for the product items according to the raw material data stored in the stock database; (2) determining via the system for making a production plan if a product request is received from the client, wherein if the product request is received, then step (3) is followed; if no product request is received, then the step (2) is followed; (3) determining via the system for making a production plan if a constructed production plan with incomplete product manufacture is present in the product plan database, wherein if it is, then step (4) is followed; or else, product items in the received product request are analyzed and assigned with respective model categories, which are each provided with an identification number corresponding to a product request containing the model category and are used for constructing a production plan to be stored in the production plan database; and then performing step (9); (4) analyzing via the system for making a production plan product delivery time and model categories for products requested by the client in the constructed production plan in the production plan database, and determining if any model category in the constructed production plan is identical to that in the received product request, wherein if at least one model category is identical, then step (5) is followed, or else step (6) is followed; (5) determining via the system for making a production plan if necessary to rapidly complete product manufacture for the received product request, wherein if the rapid product manufacture is necessary, then step (7) if followed, or else step (8) is followed; (6) providing via the system for making a production plan the model categories of the product items in the received product request with respective identification numbers corresponding to product request containing the model categories, and constructing a new production plan according to the model categories and the product delivery time, so as to store the new production plan in the production plan database; and then performing step (9); (7) incorporating via the system for making a production plan the identical model category in the constructed production plan with that in the received product request, so as to change product quantity of the model category in the pre-constructed production plan, and to record a corresponding identification number in the model category; and then performing step (9); (8) adjusting flexibly via the system for making a production plan an identification number of the identical product category in the constructed production plan for assigning the adjusted identification number to the received product request, so as to construct a new production plan and correct the constructed production plan; and then performing step (9); (9) reading the production plan stored in the production plan database via a manufacture unit of the manufacturer for performing a process for manufacturing products, and storing data relating to the process in the production plan database; (10) determining via the system for making a production plan if a message for completing the manufacturing process is received from the manufacture unit, wherein if the message is received, then step (11) is followed; if no message is received, then the step (10) is followed; and (11) searching for corresponding product requests in the production plan database via the system for making a production plan according to identification numbers of the manufactured products, and processing the products for assemblage, packaging and exportation according to the corresponding product requests.

The system for making a production plan is used for constructing a production plan according to a product request from a client for allowing the manufacturer to acquire latest conditions in product manufacture and exportation, wherein each product item is pre-assigned with a model category, so as to determine model categories for product items in the product request and provide each of the model categories in the product request with an identification number.

The system for making a production plan comprises: a stock database for storing raw material data, which are used for a purchase unit of the manufacturer to determine if to purchase in advance raw materials for subsequent use in product manufacture; a request database for storing data relating to the product request from the client, wherein the product request is provided with an unique order number; a production plan database for storing data relating to the production plan, wherein the production plan allows a manufacture unit and a sale unit of the manufacturer to acquire latest conditions in manufacture, and has model categories each including a plurality of identification numbers, which each is used to identify a product request to which the model category belongs and corresponds to the order number of the belonged product request; a planning module for constructing a new production plan according to a newly stored product request in the request database, wherein model categories are determined for product items in the newly stored product request so as to assign each of the model categories with an unique identification number corresponding to a product request containing the model category; it is determined if a constructed production plan with incomplete product manufacture is present in the production plan database, if no constructed production plan is present, a new production plan is constructed according to the newly stored product request, if the constructed production plan is present, the constructed production plan is compared with the newly stored product request for an identical model category, if no identical model category is present, the planning module constructs a new production plan according to the model categories of the product items in the newly stored product request and stores the production plan in the production plan database; if the identical model category is present, the planning module determines if necessary to rapidly complete product manufacture for the newly stored product request, if the rapid product manufacture is necessary, the planning module flexibly adjusts an identification number of the identical model category in the constructed production plan and assigns the adjusted identification number to the newly stored product request, so as to construct a new production plan and correct the constructed production plan; if the rapid product manufacture is not necessary for the newly stored product request, the planning module incorporates the identical model category in the constructed production plan with that in the newly stored product request, so as to change product quantity for the model category in the constructed production plan and record a new identification number in the model category as well as store the changed production plan in the production plan database; an integrating module for determining conditions in manufacture according to production plans in the production plan database, wherein if the manufacture unit transfers a message for completely manufacturing products, the integrating module searches corresponding order numbers of product requests according to identification numbers for the manufactured products, so as to process the manufactured products for assemblage, packaging and exportation according to the product requests; and an export database for storing data relating to a product export sheet, which is constructed by integrating the identification numbers corresponding to the order numbers of the product requests from the integrating module.

BRIEF DESCRIPTION OF THE DRAWINGS

The present invention can be more fully understood by reading the following detailed description of the preferred embodiments, with reference made to the accompanying drawings wherein:

FIGS. 4(A) and 4(B) illustrate data relating to a production plan constructed by using the system and method for making a production plan of the invention.

DETAILED DESCRIPTION OF THE PREFERRED EMBODIMENTS

Figure 1:
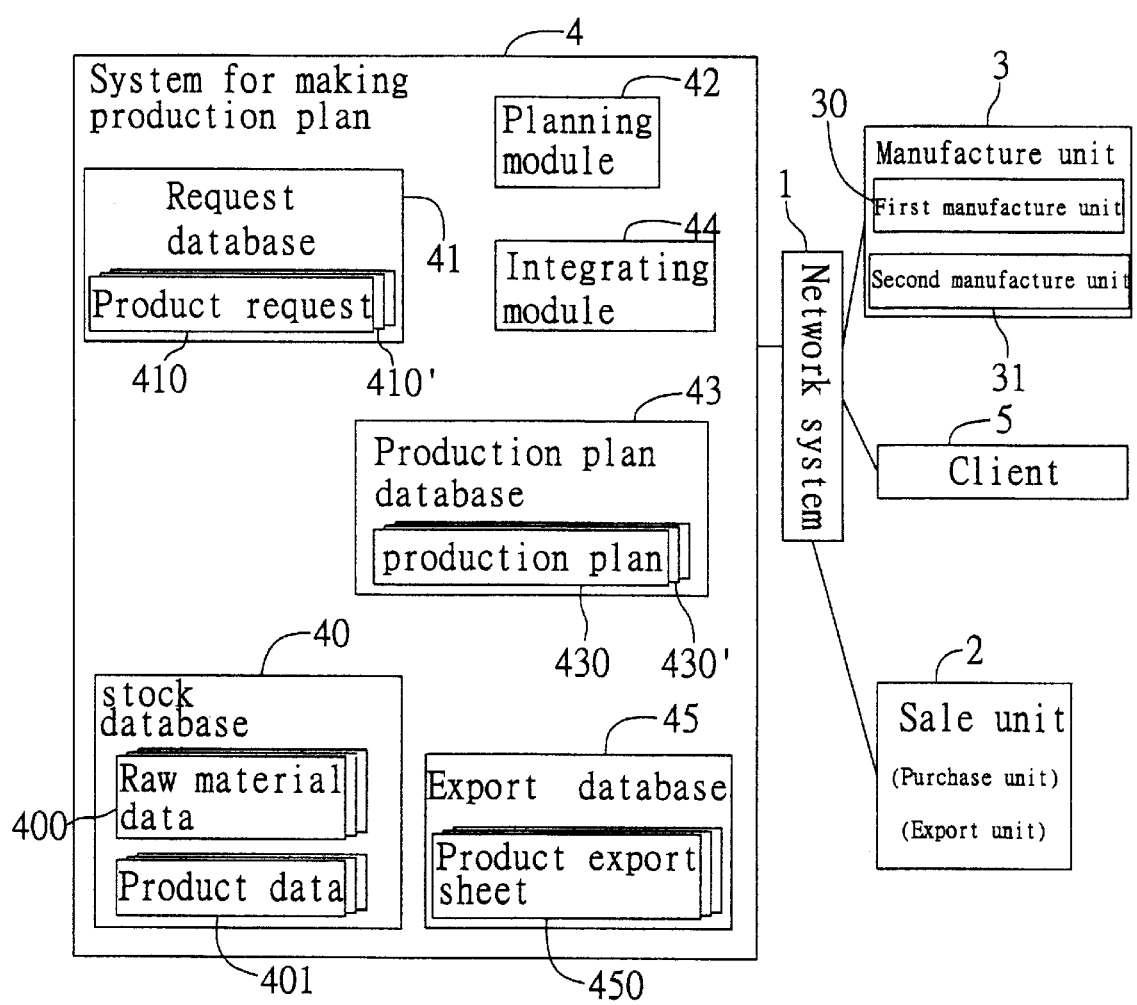
FIG. 1 is a block diagram showing system architecture for a preferred embodiment of the system for making a production plan of the invention.

Illustrated in FIG. 1 is system architecture for a preferred embodiment of the system for making a production plan 4 of the invention. As shown in the drawing, the system for making a production plan 4 constructs a production plan 430 according to a product request 410 from a client 5. The production plan 430 allows a sale unit (or purchase unit, export unit) 2 and a manufacture unit 3 of a manufacturer to access the latest conditions for product manufacture and exportation through linkage to a network system 1. The manufacture unit 3 further comprises a first manufacture unit 30, a second manufacture unit 31 and the like, e.g. manufacture completing section, PIA section, packaging section, etc. The sale unit (or purchase unit, export unit) 2 and the manufacture unit 3 can respectively acquire information in operation of the system for making a production plan 4 from a browser (not shown) of a terminal device thereof. The system for making a production plan 4 comprises a stock database 40, a request database 41, a planning module 42, a production plan database 43, an integrating module 44 and an export database 45.

The stock database 40 is used to store raw material data 400, for allowing the purchase unit 2 to determine if the raw materials need to be purchased in advance for subsequent product manufacture, and to store product data 401 including data relating to fabricated or semi-fabricated products, for allowing the sale unit 2 to determine if stock of the fabricated or semi-fabricated products is sufficient for subsequent product manufacture and exportation; while the data can be incorporated as reference for making a production plan.

The request database 41 is used for storing the product requests 410 from the client 5, while each of the product requests 410 has its unique order number. The production plan database 43 is employed for storing data relating to the constructed production plan 430, which allows the manufacture unit 3 and the sale unit 2 to be informed with the latest conditions for product manufacture in real time. The production plan 430 includes data relating to product delivery time, manufacture sections, model categories, manufacture quantity and conditions in operation of the manufacture sections. The product categories contain several sets of identification numbers, which each is used to identify the product request 410 which the corresponding model category belongs to, and corresponds to the order number of the belonged product request 410.

The planning module 42 is employed for making a new production plan 430 according to the new product request 410 stored in the request database 41. First, prior to constructing the production plan 430, product items in the product request 410 are determined for their model categories respectively, and then the model categories each is assigned with a corresponding identification number. Thereafter, in the production plan database 43 there is determined if having any constructed production plan 430' with incomplete product manufacture. In the presence of a constructed incomplete production plan 430', it is to compare if any model category in the constructed production plan 430' is identical to that in the new product request 410. In the absence of the constructed production plan 430', the planning module 42 then assigns each of the model categories in the product request 410 with a corresponding identification number, so as to make a new production plan 430 according to the model categories and product delivery time, and store the production plan 430 in the production plan database 43.

In the case of at least one model category in the constructed production plan 430' identical to that in the new product request 410, it is to re-determine if necessary to rapidly complete manufacture for the product request 410. If the rapid completion for manufacture is necessary, the planning module 42 flexibly adjusts the identification number of the identical model category in the constructed production plan 430' and assigns the adjusted identification number to the new product request 410, so as to construct the new production plan 430 and correct the constructed production plan 430'. If the rapid completion for manufacture is not necessary for the product request 410, the planning module 42 incorporates the identical model category in the constructed production plan 430' with that in the new product request 410, so as to change (i.e. increase) quantity of the model category in the constructed production plan 430' and record down a new identification number in the model category, for identifying the product request 410 to which the identification number belongs in product assemblage, packaging and exportation.

The integrating module 44 is used to determine manufacturing conditions according to the production plan 430 in the production plan database 43. Upon receiving a message for completing product manufacture transferred from the manufacture unit 3, the integrating module 44 searches order numbers corresponding to identification numbers of the manufactured products, and processes the manufactured products for assemblage, packaging and exportation according to the product requests 410 to which the products belong.

The export database 45 is used to store data relating to a product export sheet 450, wherein the integrating module 44 obtains respective identification numbers corresponding to order number of the product requests 410, and integrates the respective identification numbers into the product export sheet 450, which is used as a basis for product assemblage, packaging and exportation.

In addition, while the planning module 42 constructs the new production plan 430 according to the newly stored product request 410 in the request database 41, the planning module 42 can also in advance read the product data 401 stored in the stock database 40 for determining quantity of the manufacture or semi-manufactured products at the production line, so as to construct a more preferable production plan according to the product stock quantity. Therefore, besides significant decrease in the stock quantity and easiness in product arrangement, it is able to further control and monitor the conditions of product manufacture and exportation for each product request, and to reduce possibility of repetition in manufacture.

In the use of the system for making a production plan 4, upon receipt of the product request 410 from the client, the manufacturer can automatically establish a preferable production plan 430 according to the quantity of the manufacture or semi-manufactured products at the production line, and flexibly adjust the respective product request 410 to which each identification number belongs, so as to facilitate the manufacture for products which needs to be rapidly manufactured.

Figure 2:
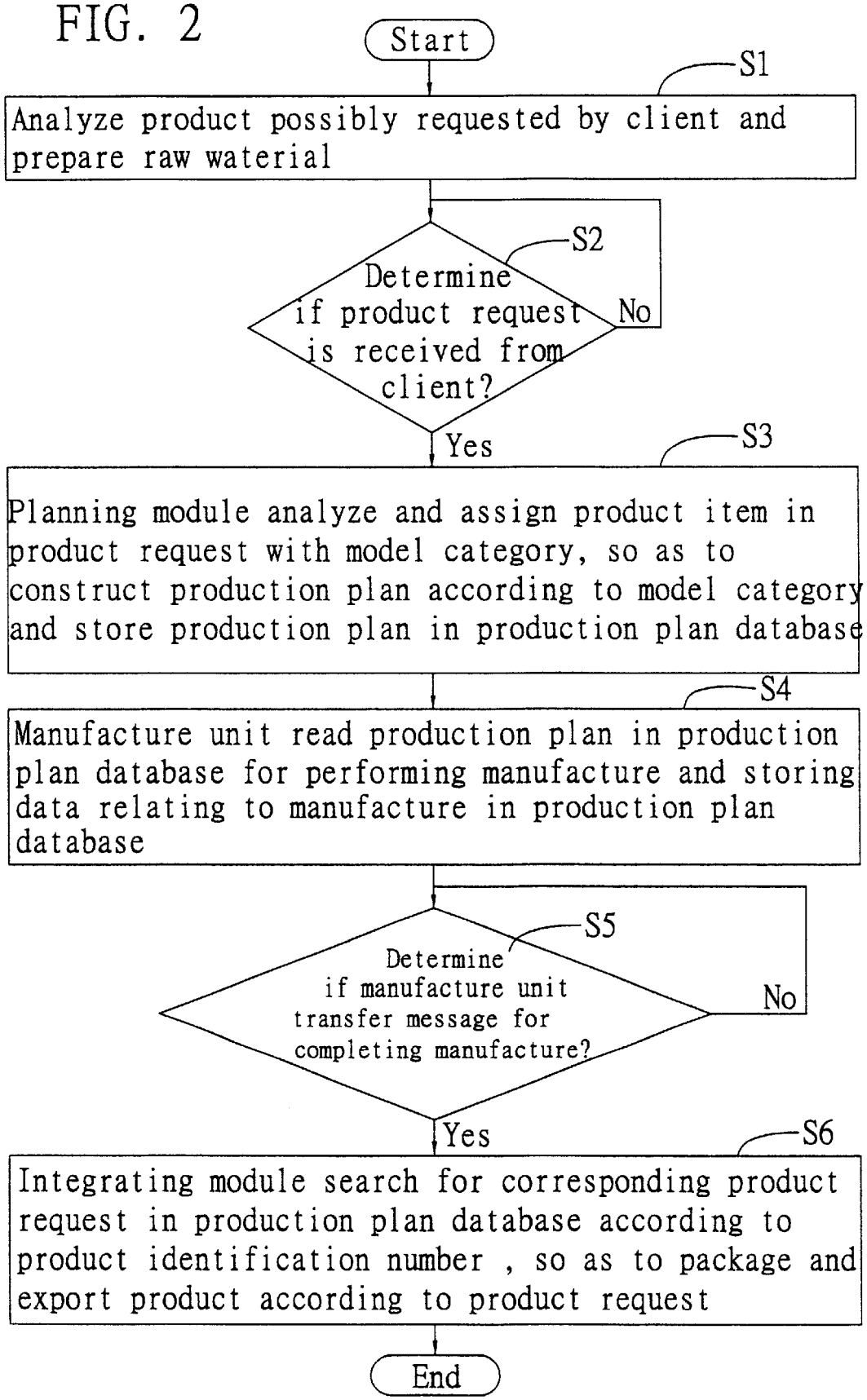
FIG. 2 is a schematic diagram showing the steps involved in using a preferred embodiment of the method for making a production plan of the invention.

FIG. 2 illustrates the steps involved in using a preferred embodiment of the method for making a production plan of the invention. The process for making a production plan of the invention is described with reference to FIGS. 1 and 2.

First, in step S1, a planning module 42 analyzes product items possibly requested in a product request 410 from a client 5, so as to allow a purchase unit 2 of a manufacturer to purchase in advance raw materials according to raw material data 400 stored in a stock database 40. Then step S2 is followed.

In step S2, the planning module 42 determines if a new product request 410 is stored in a product plan database 41. In the presence of the new product request 410, step S3 is followed, or else, the step S2 is followed.

In step S3, the planning module 42 analyzes and assigns product items in the product request 410 with respective model categories, and provides the model categories with respective identification numbers corresponding to the product request 410 to which each model category belongs, so as to make a production plan 430 according to the model categories and store the production plan 430 in a production plan database 43. Then step S4 is followed.

In step S4, a manufacture unit 3 reads the production plan 430 stored in the production plan database 43, so as to perform product manufacture and store data relating to the product manufacture in the production plan database 43. Then step S5 is followed.

In step S5, an integrating module 44 determines if a message for completing the product manufacture is generated from the manufacture unit 3. Upon receipt of the message for completing the product manufacture, step S6 is followed, or else, the step S5 is followed.

In step S6, the integrating module 44 searches in the production plan database 43 for corresponding product requests 410 according to identification numbers of the manufactured products, so as to integrate the product requests 410 into a product export sheet 450 for product assemblage, packaging and exportation.

Figure 3:
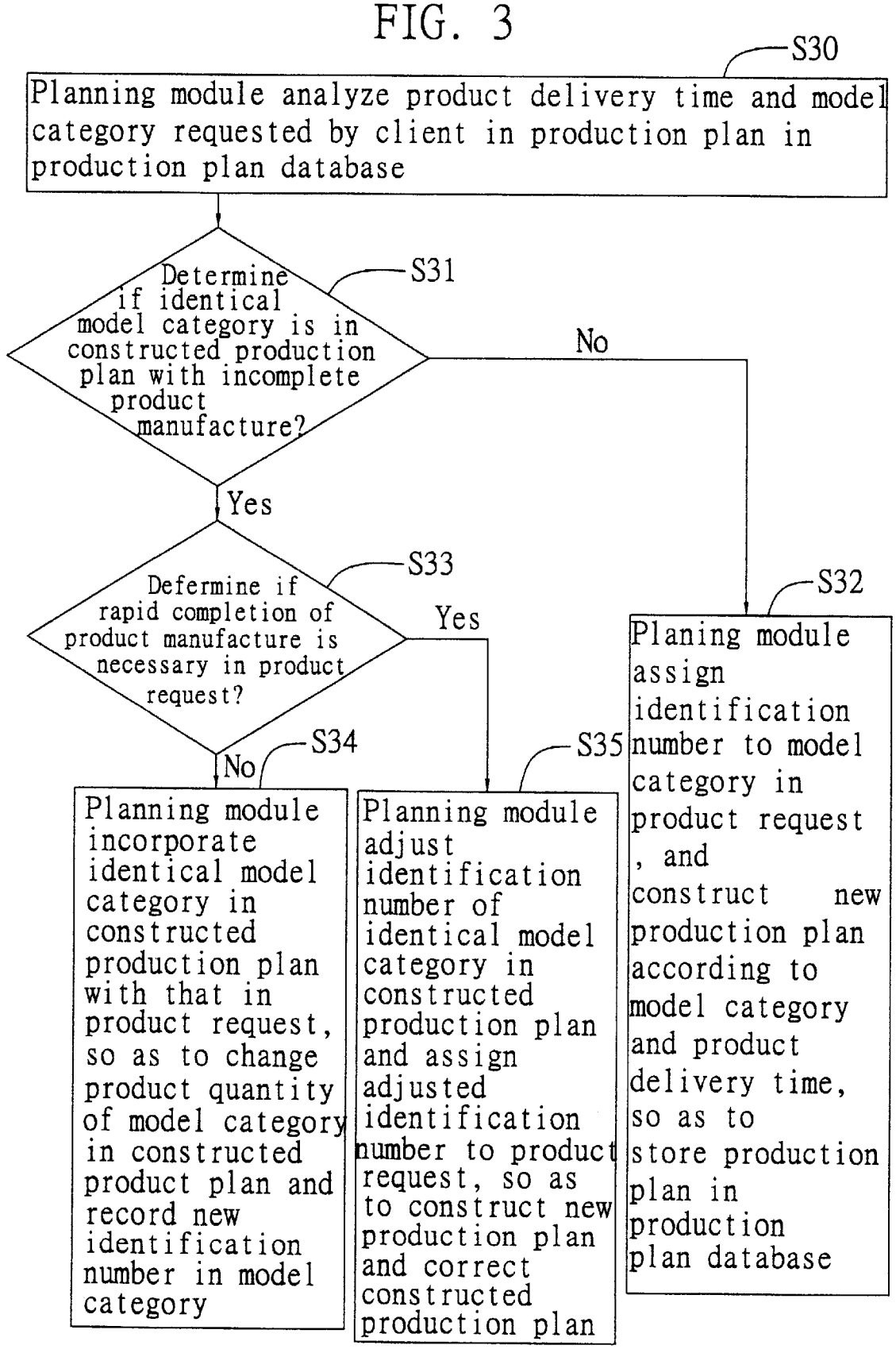
FIG. 3 is a schematic diagram showing the steps after step S3 in FIG. 2 involved in using another preferred embodiment of the method for making a production plan of the invention.

FIG. 3 illustrates the steps after step S3 in FIG. 2 involved in using another preferred embodiment of the method for making a production plan of the invention. As shown in the drawing, in step S30, the planning module 42 analyzes a constructed production plan 430' with incomplete product manufacture in the production plan database 43 for data relating to product delivery time and model categories as requested by the client. Then, step S31 is followed.

In step S31, the planning module 42 determines if any model category in the constructed production plan 430' is identical to that in a newly received product request 410. If there is at least one identical model category, then step S33 is followed, or else, step S32 is followed.

In step S32, the planning module 42 assigns each model category in the new product request 410 with an identification number corresponding to the product request 410 to which each model category belongs, and makes a new production plan 430 according to the model categories and product delivery time, while the production plan 430 is stored in the production plan database 43. Then, the step S2 in FIG. 2 is followed.

In step S33, the planning module 42 determines if necessary to rapidly complete product manufacture according to the new product request 410. If the rapid completion for the product manufacture is not necessary, then step S34 is followed, or else, step S35 is followed.

In step S34, the planning module 42 incorporates the identical model category in the new product request 410 with that in the constructed production plan 430', so as to change quantity for the identical model category in the constructed production plan 430', that is, increase the quantity, and also to record down an incorporated identification number for the identical model category, while the identification number is unique corresponding to the product request 410 to which the model category belongs. Then, the step S4 in FIG. 2 is followed.

In step S35, the planning module 42 flexibly adjusts the new product request 410 corresponding to the identification number of the identical model category in the constructed production plan 430', that is, corrects the identification number in the constructed production plan 430' by replacing the original identification number in the constructed production plan 430' into the identification number corresponding to the new product request 410, so as to save time for product manufacture. Then, the step S4 in FIG. 2 is followed.

In addition, in performing the step S3 in FIG. 2, the planning module 42 can also in advance read the product data 401 stored in the stock database 40, so as to construct a preferable production plan according to stock quantity of the manufactured or semi-manufactured products at the production line, for significantly reducing the stock quantity and the possibility for repetition in manufacture.

FIGS. 4(A) and 4(B) illustrate data relating to a production plan constructed by using the system and method for making a production plan of the invention, wherein FIG. 4(A) shows a production plan table 6, and FIG. 4(B) shows a table 7 of correlation between a model category and a corresponding identification number. As shown in FIG. 4(A), the system for making a production plan 4 displays the production plan table 6 through a network system 1 on a browser (not shown) of a terminal device requesting to read a production plan, such as a sale unit (purchase unit, export unit) 2 and a manufacture unit 3. The production plan table 6 allows the manufacture unit 3 or a sale unit 2 to be informed in real time with manufacturing correlation between a production plan 430 and each production line. As shown in the drawing, in the production plan table 6, if a number in a pallet column 65 is identical to that in a quantity column (Qty) 61, it shows that product manufacture is completed by the production line, and the number is the quantity of the manufactured products. For example of a model category A1 in a model column 61, manufacture of the model category A1 is implemented in sequence by a manufacture completing section, a PIA section and a packaging section. If a number in a completing section column 62 is 100, it means the model category A1 is still under manufacture by the completing section, wherein numbers in columns 62, 63, 64 each represents quantity of semi-manufactured products.

As shown in FIG. 4(B), in view of model categories A1 and A2, each is assigned with several sets of identification numbers, wherein the model category A1 has the identification numbers including ID0001, ID0101, ID0201 and ID0401, and the model category A2 has the identification numbers including ED0002, ID0202, ID0302, ID0502 and ID0602. Each identification number has its belonged product request 410. For example, in the use of the first four numerals of the identification number for identifying the product request, if ID00 corresponds to a first product request, the first product request then has product items of the model categories A1 and A2. If ID01 corresponds to a second product request, then the second product request merely contains a product item of the model category A1. If ID02 corresponds to a third product request, the third product request then has product items of the model categories A1 and A2. The last two numerals of the identification number are used to identify the model category. In this case, the identification number formed by incorporating the first four numerals and the last two numerals is definitely unique. Moreover, according to a newly received product request 410, if the model category A1 is present in a constructed production plan 430' with incomplete product manufacture, a planning module 42 then incorporates the product request 410 into the constructed production plan 430', for example, below the identification number ID1201 in an identification number column 70, there is added a new identification number (not shown), and also the number in the quantity column (Qty) 61 for the model category A1 is increased correspondingly. In addition, according to a newly received product request, if the planning module 42 determines that the model category A1 is present in a constructed production plan 430', and rapid manufacture for the model category A1 is required for the newly received product request, then products of the model category A1 which are completely manufactured are assigned to the newly received product request. For example, in the identification number column 70, if product delivery time is relatively sufficient for the identification number ID0001, then an identification number (not shown) for the model category A1 corresponding to the newly received product request is replaced by the identification number ID0001, and the previous identification number (not shown) in the product request can be added below the identification number ID1201 for new product manufacture. Therefore, due to flexibility in adjusting the assignment of each identification number to respective product request, it can save time for facilitating the manufacture for products to be exported efficiently.

In conclusion, the method and system for making a production plan of the invention constructs a production plan in real time according to a product request and operational conditions of a manufacture unit, so as to provide a shortened production cycle, and optimize the production rate, as well as reduce the manufacture cost and generate profit.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for making a production plan, used for connecting a manufacturer to a system for making a production plan through a network, wherein the system constructs a production plan according to a product request from a client for allowing the manufacturer to acquire latest conditions in product manufacture and exportation, and includes a stock database for storing raw material data, a request database for storing data relating to the product request from the client, a production plan database for storing data relating to the production plan, and an export database for storing data relating to the product exportation, the method for making a production plan comprising the steps of:

(1) analyzing via the system for making a production plan product items possibly requested from the client, so as to allow a purchase unit of the manufacturer to purchase in advance raw materials for the product items according to the raw material data stored in the stock database;

(2) determining via the system for making a production plan if a product request is received from the client, wherein if the product request is received, then step (3) is followed; if no product request is received, then the step (2) is followed;

(3) analyzing via the system for making a production plan product items in the product request for assigning the product items with respective model categories, which are each provided with an identification number corresponding to a product request containing the model category, and are used for constructing a production plan to be stored in the production plan database;

(3-1) analyzing via the system for making a production plan product delivery time and model categories for products requested by the client in a constructed production plan with incomplete product manufacture in the production plan database;

(3-2) determining via the system for making a production plan if any model category in the constructed production plan is identical to that in the product request received from the client, wherein if at least one model category is identical, then step (3-3) is followed, or else step (3-4) is followed;

(3-3) determining via the system for making a production plan if necessary to rapidly complete product manufacture for the received product request, wherein if the rapid product manufacture is necessary, then step (3-5) is followed, or else step (3-6) is followed;

(3-4) providinq via the system for making a production plan the model categories of the product items in the received product request with respective identification numbers corresponding to product requests containing the model categories, and constructing a new production plan according to the model categories and the product delivery time, so as to store the new production plan in the production plan database; and then returning to the step (4);

(3-5) incorporating via the system for making a production plan the identical model category in the constructed production plan with that in the received product request, so as to change manufacturing quantity of the model category in the constructed production plan, and to record a new identification number in the model category; and then returning to the step (4);

(3-6) adjusting flexibly via the system for making a production plan an identification number of the identical product category in the constructed production plan for assigning the adjusted identification number to the received product request, so as to construct a new production plan and correct the constructed production plan; and then returning to the step (4);

(4) reading the production plan stored in the production plan database via a manufacture unit of the manufacturer for performing a process for manufacturing products and storing data relating to the process in the production plan database;

(5) determining via the system for making a production plan if a message for completing the manufacturing process is received from the manufacture unit, wherein if the message is received, then step (6) is followed; if no message is received, then the step (5) is followed; and (6) searching for corresponding product requests in the production plan database via the system for making a production plan according to identification numbers of the manufactured products, and processing the products for assemblage, packaging and exportation according to the corresponding product requests, wherein the stock database further stores product data relating to quantity of manufactured or semi-manufactured products at a production line, and the step (3-4) further comprises a step of reading in the stock database via the system for making a production plan the product data relating to the model categories of the product items in the received product request, so as to construct the production plan.

2. A method for making a production plan, used for connecting a manufacturer to a system for making a production plan through a network, wherein the system constructs a production plan according to a product request from a client for allowing the manufacturer to acquire latest conditions in product manufacture and exportation, and includes a stock database for storing raw material data, a request database for storing data relating to the product request from the client, a production plan database for storing data relating to the production plan, and an export database for storing data relating to the product exportation, wherein the system for making a production plan analyzes and assigns product items in the product request with respective model categories and provides the model categories each with an identification number corresponding to a product request containing the model category, so as to construct the production plan according to the model categories and store the production plan in the production plan database; the method for making a production plan comprising the steps of (1) analyzing via the system for making a production plan product items possibly requested from the client, so as to allow a purchase unit of the manufacturer to purchase in advance raw materials for the product items according to the raw material data stored in the stock database;

(2) determining via the system for making a production plan if a product request is received from the client, wherein if the product request is received, then step (3) is followed; if no product request is received, then the step (2) is followed;

(3) determining via the system for making a production plan if a constructed production plan with incomplete product manufacture is present in the product plan database, wherein if it is, then step (4) is followed; or else, product items in the received product request are analyzed and assigned with respective model categories, which are each provided with an identification number corresponding to a product request containing the model category and are used for constructing a production plan to be stored in the production plan database; and then performing step (9);

(4) analyzing via the system for making a production plan product delivery time and model categories for products requested by the client in the constructed production plan in the production plan database, and determining if any model category in the constructed production plan is identical to that in the received product request, wherein if at least one model category is identical, then step (5) is followed, or else step (6) is followed;

(5) determining via the system for making a production plan if necessary to rapidly complete product manufacture for the received product request, wherein if the rapid product manufacture is necessary, then step (7) if followed, or else step (8) is followed;

(6) providing via the system for making a production plan the model categories of the product items in the received product request with respective identification numbers corresponding to product request containing the model categories, and constructing a new production plan according to the model categories and the product delivery time, so as to store the new production plan in the production plan database; and then performing step (9);

(7) incorporating via the system for making a production plan the identical model category in the constructed production plan with that in the received product request, so as to change product quantity of the model category in the pre-constructed production plan, and to record a new identification number in the model category; and then performing step (9);

(8) adjusting flexibly via the system for making a production plan an identification number of the identical product category in the constructed production plan for assigning the adjusted identification number to the received product request, so as to construct a new production plan and correct the constructed production plan; and then performing step (9);

(9) reading the production plan stored in the production plan database via a manufacture unit of the manufacturer for performing a process for manufacturing products, and storing data relating to the process in the production plan database;

(10) determining via the system for making a production plan if a message for completing the manufacturing process is received from the manufacture unit, wherein if the message is received then step (11) is followed; if no message is received, then the step (10) is followed; and

(11) searching for corresponding product requests in the production plan database via the system for making a production plan according to identification numbers of the manufactured products, and processing the products for assemblage, packaging and exportation according to the corresponding product requests.

3. The method of claim 2, wherein the stock database further stores product data relating to quantity of manufactured or semi-manufactured products at a production line, and the step (6) further comprises a step of: reading in the stock database via the system for making a production plan the product data relating to the model categories of the product items in the received product request so as to construct the production plan.

4. The method of claim 2, wherein the identification numbers each is unique corresponding to a product request to which the identification number belongs.

5. The system of claim 4, wherein the stock database further stores product data relating to quantity of manufactured or semi-manufactured products at a production line, for allowing the planning module to read the product data in the stock database relating to the model categories of the product items in the newly stored product request, so as to construct the production plan.

6. A system for making a production plan, used for constructing a production plan according to a product request from a client for allowing the manufacturer to acquire latest conditions in product manufacture and exportation, wherein each product item is pre-assigned with a model category, so as to determine model categories for product items in the product request and provide each of the model categories in the product request with an identification number; the system for making a production plan comprising:

a stock database for storing raw material data which are used for a purchase unit of the manufacturer to determine if to purchase in advance raw materials for subsequent use in product manufacture;

a request database for storing data relating to the product request from the client, wherein the product request is provided with an unique order number;

a production plan database for storing data relating to the production plan, wherein the production plan allows a manufacture unit and a sale unit of the manufacturer to acquire latest conditions in manufacture, and has model categories each including a plurality of identification numbers, which each is used to identify a product request to which the model category belongs and corresponds to the order number of the belonged product request;

a planning module for constructing a new production plan according to a newly stored product request in the request database, wherein model categories are determined for product items in the newly stored product request so as to assign each of the model categories with an unique identification number corresponding to a product request containing the model category; it is determined if a constructed production plan with incomplete product manufacture is present in the production plan database, if no constructed production plan is present, a new production plan is constructed according to the newly stored product request, if the constructed production plan is present, the constructed production plan is compared with the newly stored product request for an identical model category, if no identical model category is present, the planning module constructs a new production plan according to the model categories of the product items in the newly stored product request and stores the production plan in the production plan database; if the identical model category is present, the planning module determines if necessary to rapidly complete product manufacture for the newly stored product request, if the rapid product manufacture is necessary, the planning module flexibly adjusts an identification number of the identical model category in the constructed production plan and assigns the adjusted identification number to the newly stored product request, so as to construct a new production plan and correct the constructed production plan; if the rapid product manufacture is not necessary for the newly stored product request, the planning module incorporates the identical model category in the constructed production plan with that in the newly stored product request, so as to change product quantity for the model category in the constructed production plan and record a new identification number in the model category as well as store the changed production plan in the production plan database;

an integrating module for determining conditions in manufacture according to production plans in the production plan database, wherein if the manufacture unit transfers a message for completely manufacturing products, the integrating module searches corresponding order numbers of product requests according to identification numbers for the manufactured products, so as to process the manufactured products for assemblage, packaging and exportation according to the product requests; and an export database for storing data relating to a product export sheet, which is constructed by integrating the identification numbers corresponding to the order numbers of the product requests from the integrating module.

* * * * *